United States Patent [19]

Carroll, Jr.

[11] Patent Number: 5,810,161

[45] Date of Patent: Sep. 22, 1998

[54] RECEPTACLE FOR DIFFERENT SWITCHES

[76] Inventor: James M. Carroll, Jr., 6 Hunting St., Wellesley, Mass. 02181

[21] Appl. No.: 633,661

[22] Filed: Apr. 17, 1996

[51] Int. Cl.⁶ ....................................................... H01H 9/02
[52] U.S. Cl. ........................... 200/296; 200/293; 200/294
[58] Field of Search ................................... 200/296, 294, 200/295, 293; 248/27.1, 27.3; 361/807, 810, 805

[56] References Cited

U.S. PATENT DOCUMENTS 5,350,140   9/1994   Ripley et al. ............................ 200/296

*Primary Examiner*—David J. Walczak

[57] ABSTRACT

A receptacle for a switch in a control panel accepts either a long or a short switch. The receptacle accommodates a footprint of a long switch and has structure supporting a set of bearing areas for engaging a housing of a long switch and support structure for a second set of bearing areas for engaging a housing of a short switch. The bearing areas for the short switch are positioned adjacent to long edges of the footprint of the long switch. Such receptacles permit design of a standard control panel which accommodates different combinations and arrangements of control switches.

6 Claims, 6 Drawing Sheets

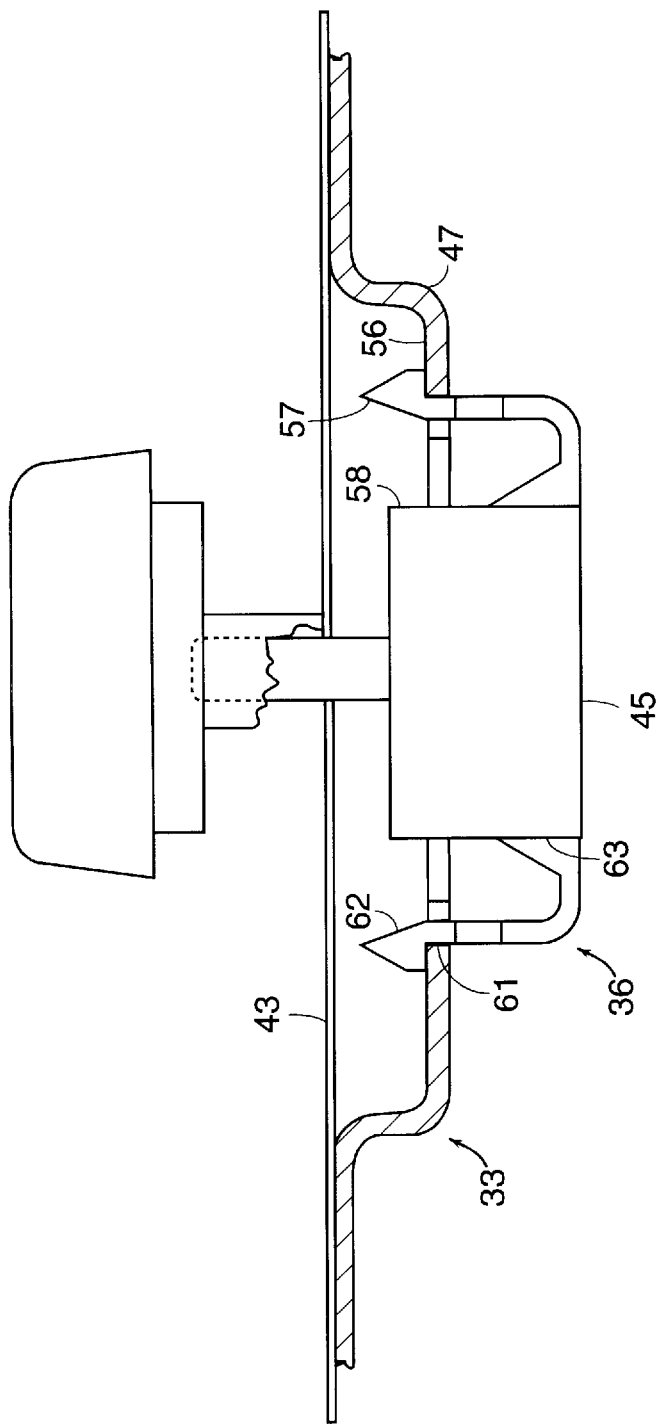

RECEPTACLE FOR DIFFERENT SWITCHES

BRIEF SUMMARY OF THE INVENTION

This invention relates to control panels for appliances such as washing machines and more particularly to receptacles in such panels in which are installed switches.

Appliances such as washing machines frequently include a control panel which serves as a support structure on which are mounted several switches in positions where they are accessible to an operator. The switches so mounted may be of different sizes, and in particular may include both a switch with an elongated housing and a switch with a short housing. The practice has been to provide in the panel a receptacle specifically sized for the switch to be installed therein. Appliance manufacturers, however, frequently make a line of products which offer different degrees of choice of operations and accordingly require different control switches. The present invention provides in a control panel a versatile receptacle which accepts either a long or a short switch. Use of such receptacles permits design of a standard control panel which accommodates different combinations and arrangements of control switches to be installed and so can be used for all members of the line.

BRIEF DESCRIPTION OF THE DRAWING

FIGS. 5 and 6 show in plan and side view the receptacle of FIG. 2 with a short switch installed therein.

DETAILED DESCRIPTION

Figure 3:
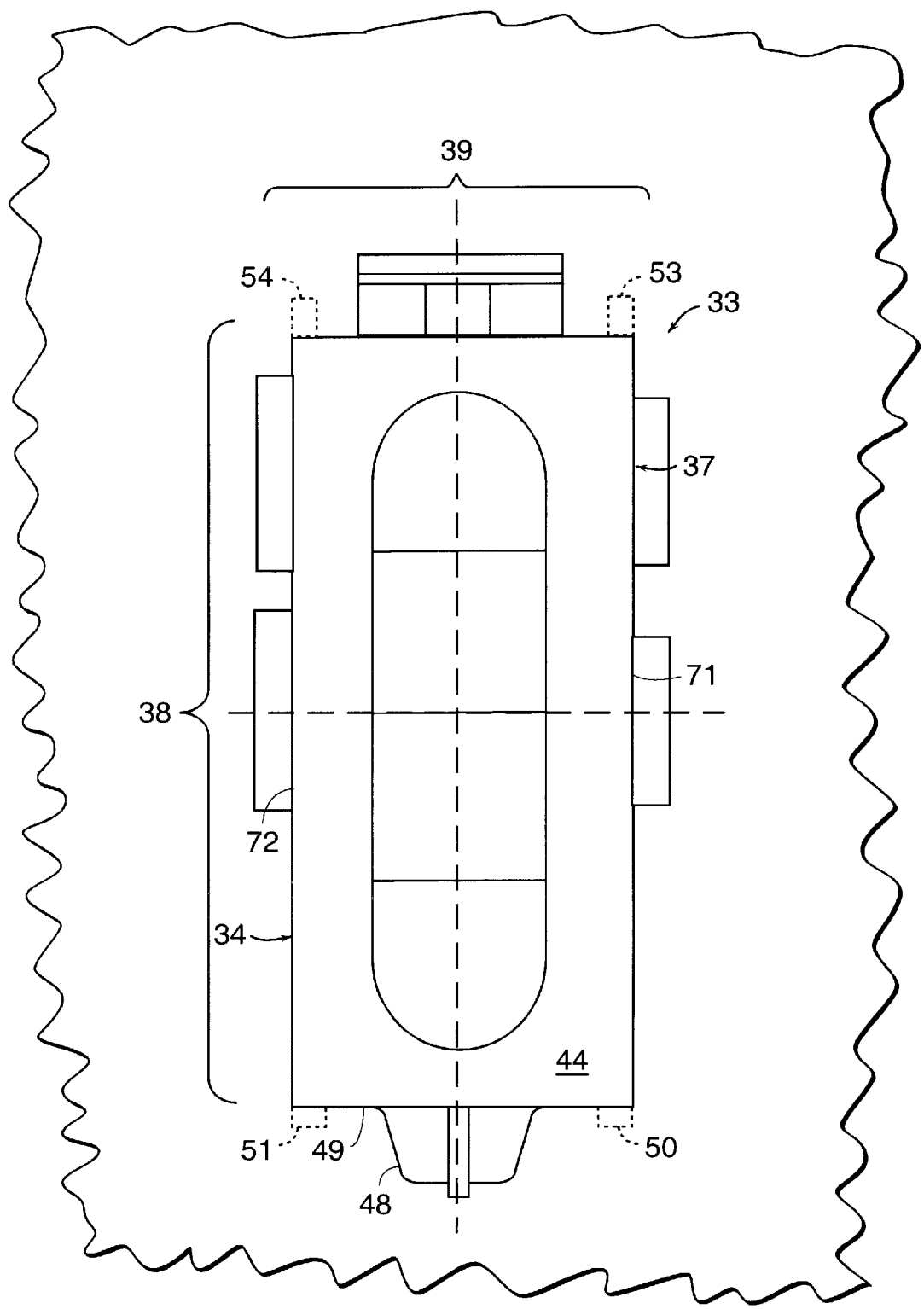
FIGS. 3 and 4 show in plan and side view the receptacle of FIG. 2 with a long switch installed therein.
Figure 4:
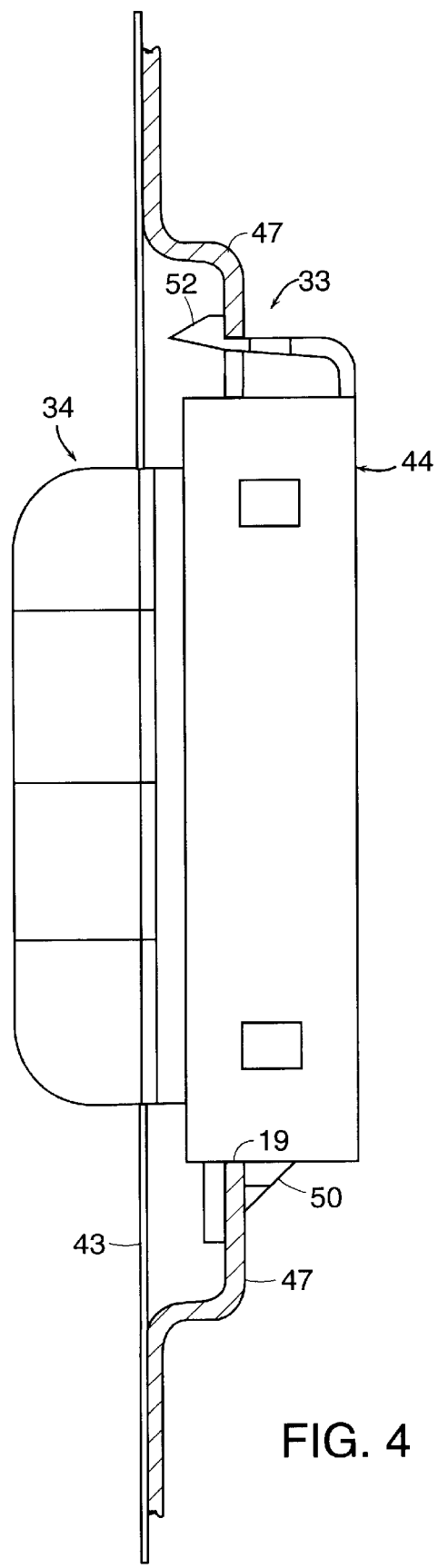
Figure 5:
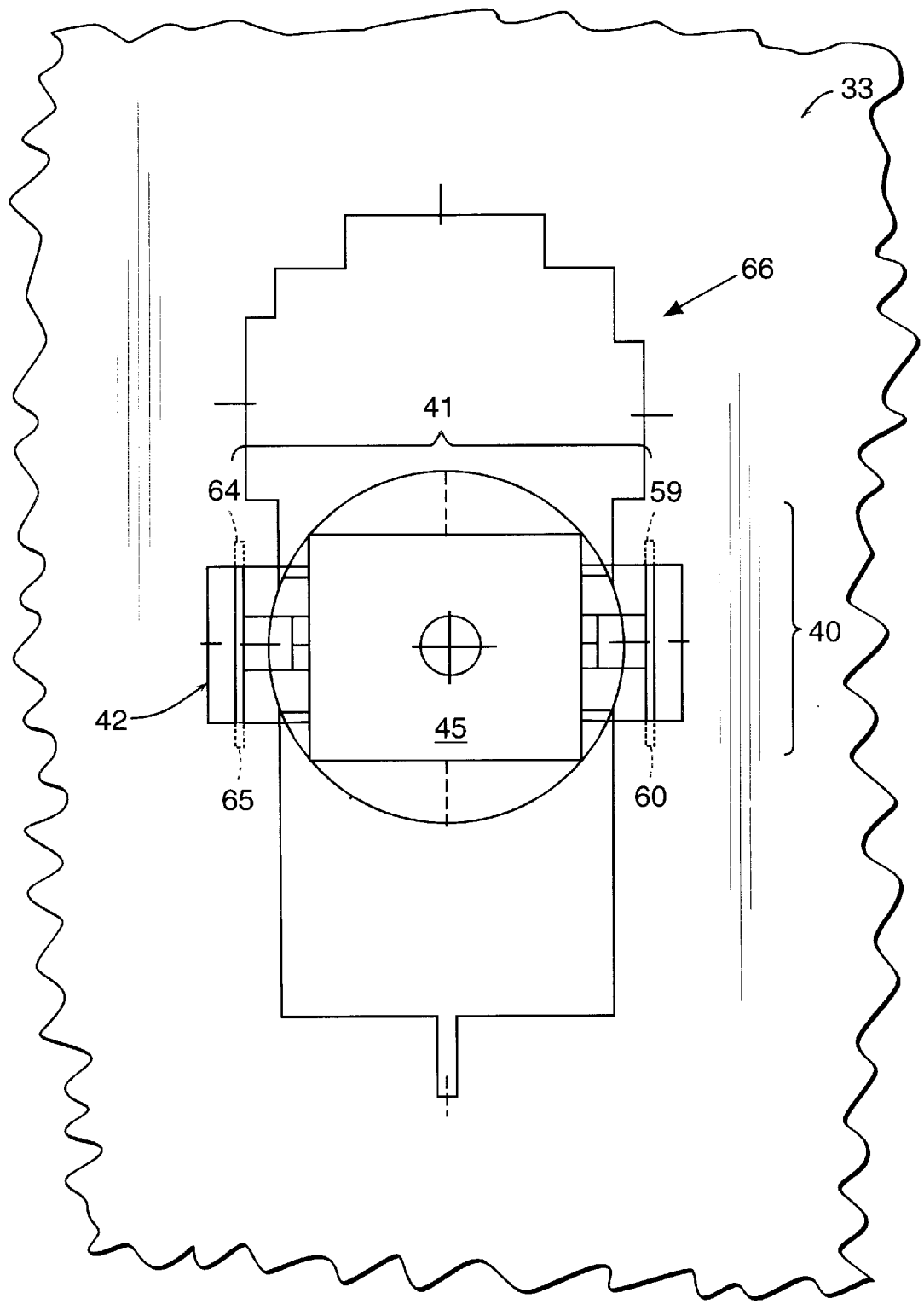

Referring to the Figures, appliance 30 includes control panel 31 which has structure 32 supporting three receptacles 33 in which are mounted long switch 34, with an elongated housing 44 and short switches 35 and 36. As shown particularly in FIG. 3, long switch 34 has a footprint 37 (that is, an outline as presented to an operator facing control panel 31) that is generally rectangular with a longer dimension 38 that is more than two times its shorter dimension 39, while as shown in FIG. 5, short switch 36 has a short housing 45 footprint 42 with neither of its dimensions 40 and 41 as great as longer dimension 36 of long switch 34. As shown in FIGS. 4 and 6, a covering 43 may be affixed to the front of control panel 31 to carry legends or for appearance.

Figure 1:
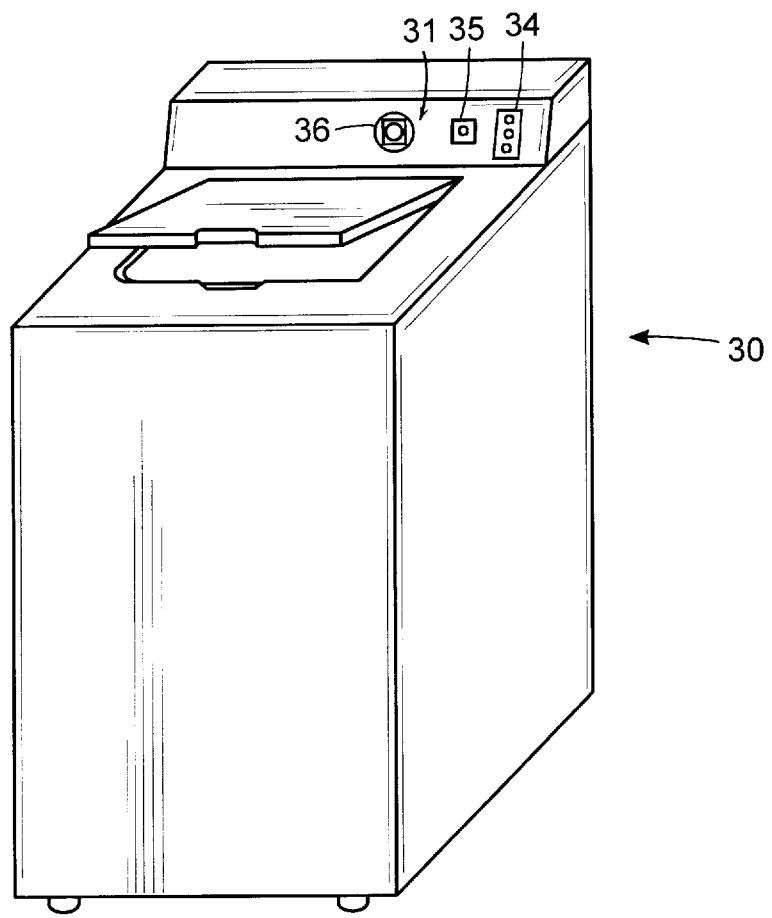
FIG. 1 shows an appliance having a control panel with receptacles according to the invention.
Figure 2:
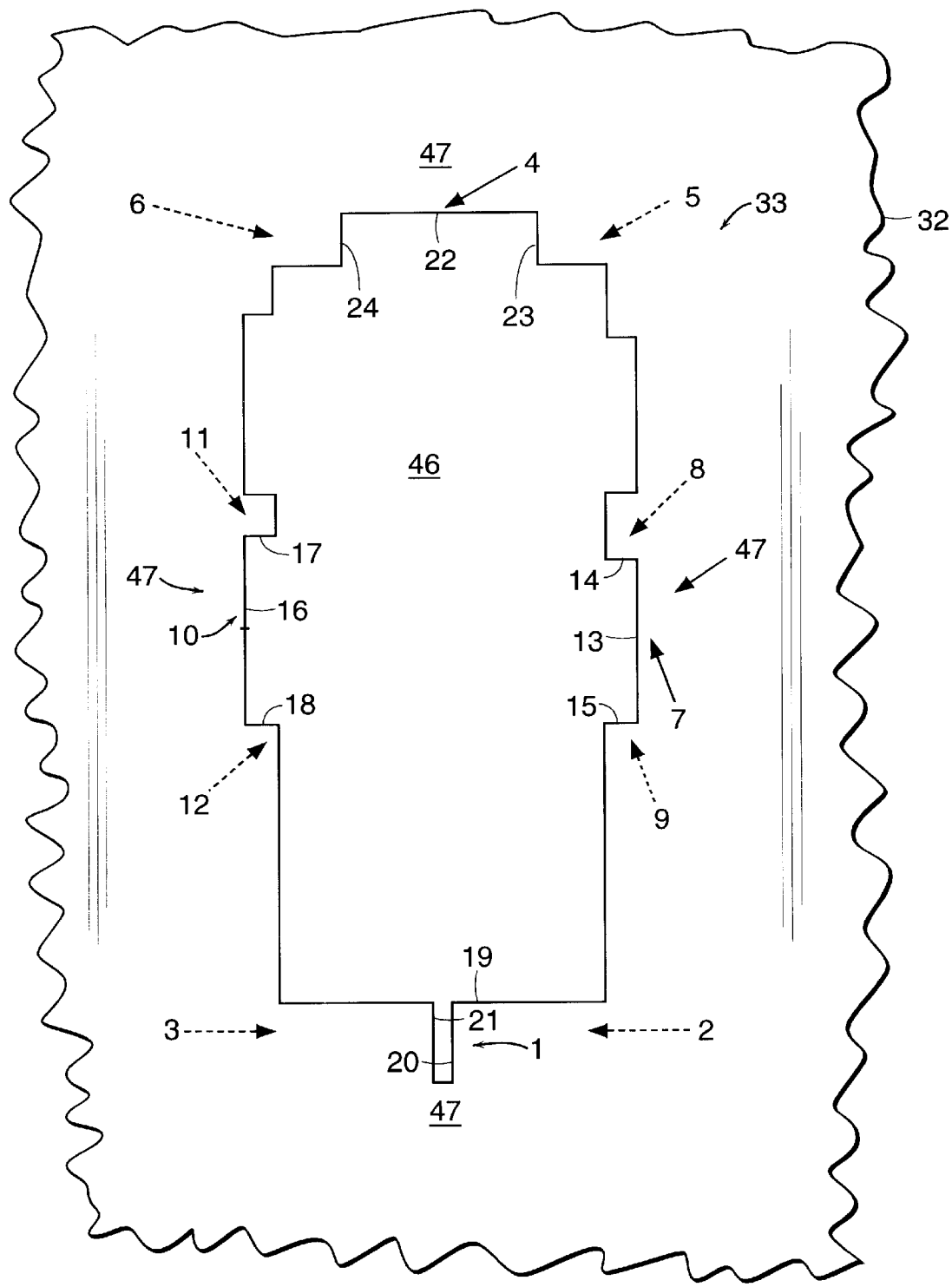
FIG. 2 shows in plan a portion of the control panel of FIG. 1, including a receptacle according to the invention.

As shown particularly in FIG. 2, receptacle 33 provides open space 46 accommodating a footprint 37 of a long switch and structure 47 supporting a set of bearing areas for engaging an installed elongated housing 44 of a long switch. These bearing areas include: bearing area 1 facing forwards (that is towards an operator of the appliance) and positioned to engage the back face of protuberance 43 extending from shorter side 49 of long switch housing 44; bearing area 2 and bearing area 3 facing backwards and positioned to engage front faces of protuberances 50 and 51 extending from side 49 of housing 44: bearing areas 19, 21, and 21 facing at right angles to bearing area 1, bearing areas 20 and 21 facing each other and being at right angle to bearing area 1; bearing area 4 facing forward and positioned to engage a back face of a snap catch 52 extending from a short side of housing 44; bearing areas 5 and 6 facing backward and positioned to engage front faces of protuberances 53 and 54 extending from a short side of housing 44; bearing areas 22, 23, and 24 facing at right angle to bearing areas 5 and 6, bearing areas 23 and 24 facing each other and being oriented at a right angle to bearing area 22. The set of bearing areas 1, 2, 3, 4, 5, 6, 19, 20, 21, 22, 23, 24 are effective in constraining an installed long housing against all degrees of freedom relative to control panel 31.

Support structure 47 of receptacle 33 also supports a second set of bearing areas for engaging a installed housing 45 of a short switch. These bearing areas are positioned adjacent to long edges 71 and 72 of footprint 37 and include: bearing area 7 facing forwards and positioned to engage a back face 56 of a snap catch 57 extending from side 58 of housing 45; bearing areas 8 and 9 facing backwards and positioned to engage front faces of protuberances 59 and 60 extending from housing 45; bearing areas 13, 14, and 15 adjacent to bearing area 7 and facing at right angle to bearing areas 8 and 9, bearing areas 14 and 15 facing each other and facing at right angles to the direction bearing area 13 faces; bearing area 10 facing forwards and positioned to engage a back face 61 of snap catch 62 extending from side 63 of housing 45; bearing areas 11 and 12 facing backward and positioned to engage front faces of protuberances 64 and 65 extending from housing 45; bearing areas 16, 17, and 18 adjacent to bearing area 10 and facing at right angles to bearing areas 11 and 12, bearing areas 17 and 18 facing each other and facing at right angles to bearing area 16. The set of bearing areas 7, 8, 9, 10, 11, 12, 13, 14, 15, 16, 17, and 18 are effective in constraining an installed short housing against all degrees of freedom relative to control panel 31.

The space between bearing areas 14 and 15 is made unequal to that between bearing areas 17 and 18 in order to admit a switch in only one orientation and in particular the space between bearing areas 14 and 15 may be advantageously between 0.7 in. and 0.8 in., while the space between bearing areas 17 and 18 is between 0.9 and 1.0 in.

A receptacle realizes additional versatility by including an additional slot 66 for insertion of a short switch to provide a choice of the position for such a switch.

I claim:

1. A receptacle in a control panel having a front surface facing forwards and a rear surface facing backwards for receiving and constraining against all degrees of freedom either a control device with a long housing having a footprint that is generally rectangular with a longer dimension greater than two times a shorter dimension, or a control device with a short housing having a footprint that has no dimension as long as said longer dimension of said long housing, said receptacle comprising structure supporting a first set of bearing areas and a second set of bearing areas for bearing against portions of said housing, said first set of bearing areas including a first bearing area facing forwards, a second bearing area and a third bearing area each facing backwards, a fourth bearing area facing forwards, a fifth bearing area and a sixth bearing area each facing backwards, said second set of bearing areas including a seventh bearing area facing forwards, an eighth bearing area and a ninth bearing area each facing backwards, a tenth bearing area facing forwards, an eleventh bearing area and a twelfth bearing area each facing backwards, a thirteenth bearing area, a fourteenth bearing area, and a fifteenth bearing area, all adjacent to the seventh bearing area and facing at right angles to the direction the eighth and ninth bearing areas face, the fourteenth bearing area and the fifteenth bearing area facing each other and facing at right angles to the direction the thirteenth bearing area faces.

2. A receptacle as claimed in claim 1, said second set of bearing areas additionally including a sixteenth bearing area, a seventeenth bearing area, and an eighteenth bearing area, all adjacent to the tenth bearing area and facing at right angle to the direction the eleventh and twelfth bearing areas face, the seventeenth bearing area and the eighteenth bearing area facing each other and facing at right angle to the direction the sixteenth bearing area faces.

3. A receptacle as claimed in claim 2, wherein the space between the fourteenth bearing area and the fifteenth bearing area is not equal to the space between the seventeenth bearing area and the eighteenth bearing area.

4. A receptacle as claimed in claim 3, spacing between the fifteenth bearing area and the fourteenth bearing area being between 0.7 in. and 0.8 in., and spacing between the seventeenth bearing area and the eighteenth bearing area being between 0.9 in. and 1.0 in.

5. A receptacle as claimed in claim 2, having fitted therein a control device housing which engages said first bearing area, said second bearing area, said third bearing area, said fourth bearing area, said fifth bearing area, and said sixth bearing area.

6. A receptacle as claimed in claim 2, having fitted therein a control device housing which engages said seventh bearing area, said eighth bearing area, said ninth bearing area, said tenth bearing area, said eleventh bearing area, said twelfth bearing area, said thirteenth bearing area, said fourteenth bearing area, said fifteenth bearing area, said sixteenth bearing area, said seventeenth bearing area, and said eighteenth bearing area.

* * * * *